US012572616B2

(12) United States Patent
Ji et al.

(10) Patent No.: US 12,572,616 B2
(45) Date of Patent: Mar. 10, 2026

(54) MULTIMEDIA RESOURCE DISPLAY METHOD AND APPARATUS

(71) Applicant: SHANGHAI BILIBILI TECHNOLOGY CO., LTD., Shanghai (CN)

(72) Inventors: Yunjie Ji, Shanghai (CN); Cheng Chen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 367 days.

(21) Appl. No.: 18/265,203

(22) PCT Filed: Sep. 23, 2021

(86) PCT No.: PCT/CN2021/119989
§ 371 (c)(1),
(2) Date: Jun. 2, 2023

(87) PCT Pub. No.: WO2022/134689
PCT Pub. Date: Jun. 30, 2022

(65) Prior Publication Data
US 2024/0037166 A1 Feb. 1, 2024

(30) Foreign Application Priority Data
Dec. 21, 2020 (CN) .......................... 202011517275.4

(51) Int. Cl.
G06F 16/957 (2019.01)
H04N 21/472 (2011.01)
H04N 21/4782 (2011.01)

(52) U.S. Cl.
CPC ..... *G06F 16/957* (2019.01); *H04N 21/47217* (2013.01); *H04N 21/4782* (2013.01)

(58) Field of Classification Search
CPC ...... G06F 16/957; G06F 15/16; G06F 16/438; G06F 16/435; G06F 16/9535;
(Continued)

(56) References Cited

U.S. PATENT DOCUMENTS 8,739,019 B1 5/2014 Nevins
2012/0236201 A1* 9/2012 Larsen ................... G06Q 30/02
348/468
(Continued)

FOREIGN PATENT DOCUMENTS

CN 106233740 A 12/2016
CN 106909547 A 6/2017
(Continued)

OTHER PUBLICATIONS

Kevin Ponto, VideoBlaster: a distributed, low-network bandwidth method for multimedia playback on tiled display systems (2009) (Year: 2009).*
(Continued)

*Primary Examiner* — Rayeez R Chowdhury
(74) *Attorney, Agent, or Firm* — BakerHostetler

(57) ABSTRACT

This application provides techniques for presenting multimedia resources. The techniques comprises obtaining a browsing instruction submitted by a user, and sending a browsing request to a server based on the browsing instruction; receiving a multimedia resource delivered by the server for the browsing request, and generating a browsing page based on the multimedia resource and displaying the browsing page to the user; in response to receiving a touch instruction performed by the user on the browsing page, determining multiple sub-resources with an association relationship from the multimedia resource based on the touch instruction; and generating a display page including at least
(Continued)

two sub-resources based on the multiple sub-resources, and displaying the display page to the user.

12 Claims, 6 Drawing Sheets

(58) Field of Classification Search
CPC ........ G06F 16/955; G06F 21/36; G06F 11/34; G06F 3/048; G06F 11/36; G06F 12/12; G06F 16/2457; G06F 16/248; G06F 16/958; G06F 3/00; G06F 3/041; G06F 3/0488; G06F 7/00; G06F 13/00; G06F 16/23; G06F 16/43; G06F 16/432; G06F 16/44; G06F 16/45; G06F 16/583; G06F 16/63; G06F 3/0481; G06F 3/0482; G06F 3/0484; G06F 3/04842; G06F 3/0485; G06F 3/0487; G06F 3/16; G06F 40/14; G06F 40/253; G06F 40/284; G06F 40/30; G06F 40/58; G06F 7/08; G06F 9/445; G06F 9/451

See application file for complete search history.

(56) References Cited

U.S. PATENT DOCUMENTS

| | | | |
|---|---|---|---|
| 2014/0245352 A1* | 8/2014 | Tseng | G06F 3/04883 |
| | | | 725/50 |
| 2015/0130816 A1 | 5/2015 | Vigneras et al. | |

FOREIGN PATENT DOCUMENTS

| | | |
|---|---|---|
| CN | 107071525 A | 8/2017 |
| CN | 109829060 A | 5/2019 |
| CN | 110909274 A | 3/2020 |
| CN | 111026992 A | 4/2020 |

OTHER PUBLICATIONS

International Patent Application No. PCT/CN2021/119989; Int'l Search Report; dated Nov. 24, 2021; 2 pages.

* cited by examiner

MULTIMEDIA RESOURCE DISPLAY METHOD AND APPARATUS

CROSS-REFERENCE TO RELATED APPLICATIONS

This application is the U.S. National Stage of International Application No. PCT/CN2021/119989, filed on Sep. 23, 2021, which claims priority to Chinese Patent Application No. 202011517275.4, filed with the China National Intellectual Property Administration on Dec. 21, 2020, and entitled "MULTIMEDIA RESOURCE DISPLAY METHOD AND APPARATUS", both of which are incorporated herein by reference in their entireties.

TECHNICAL FIELD

This application relates to the field of multimedia playback technologies, and in particular, to a multimedia resource display method. This application also relates to a multimedia resource display apparatus, a multimedia resource display system, a computing device, a computer-readable storage medium, and a computer program product.

BACKGROUND

With development of Internet technologies, watching requirements of users for multimedia resources gradually increase. Further, to meet the watching requirements of users, a single type of multimedia resource is usually converted into a plurality of types of multimedia resources for the user to watch. For example, an animation video is created based on a cartoon work for the user to watch, or a TV series/movie is created based on a text work for the user to watch. However, different types of multimedia resources have different playback paths, and the different types of multimedia resources have different update progresses. Consequently, it is easy to cause the user to be unable to accurately determine a progress relationship between multimedia resources with same content but different types. If the user needs to determine the progress relationship, the user needs to independently complete check to determine the progress relationship. It not only takes much time for the user to determine the progress relationship, but also greatly reduces watching experience of the user.

SUMMARY

In view of this, embodiments of this application provide a multimedia resource display method. This application also relates to a multimedia resource display apparatus, a multimedia resource display system, a computing device, a computer-readable storage medium, and a computer program product. This aims to resolve a problem in the conventional technology that a user cannot perceive a progress relationship between associated multimedia resources.

According to a first aspect of the embodiments of this application, a multimedia resource display method is provided. The method is applied to a client and includes:

obtaining a browsing instruction submitted by a user, and sending a browsing request to a server based on the browsing instruction;

receiving a multimedia resource delivered by the server for the browsing request, and generating a browsing page based on the multimedia resource and displaying the browsing page to the user;

when a touch instruction submitted by the user for the browsing page is received, determining multiple multimedia sub-resources with an association relationship from the multimedia resource based on the touch instruction; and generating, based on the multiple multimedia sub-resources, a display page including at least two multimedia sub-resources, and displaying the display page to the user.

According to a second aspect of the embodiments of this application, a multimedia resource display apparatus is provided. The apparatus is applied to a client and includes:

a browsing instruction obtaining module, configured to obtain a browsing instruction submitted by a user, and send a browsing request to a server based on the browsing instruction;

a browsing page display module, configured to receive a multimedia resource delivered by the server for the browsing request, and generate a browsing page based on the multimedia resource and display the browsing page to the user;

a resource determining module, configured to: when a touch instruction submitted by the user for the browsing page is received, determine multiple multimedia sub-resources with an association relationship from the multimedia resource based on the touch instruction; and a display page generation module, configured to generate, based on the multiple multimedia sub-resources, a display page including at least two multimedia sub-resources, and display the display page to the user.

According to a third aspect of the embodiments of this application, a multimedia resource display method is provided. The method is applied to a server and includes:

receiving a browsing request sent by a client;

extracting, from a multimedia resource library, multiple groups of multimedia sub-resources with an association relationship that match the browsing request; and generating a multimedia resource based on the multiple groups of multimedia sub-resources with an association relationship, and sending the multimedia resource to the client.

According to a fourth aspect of the embodiments of this application, a multimedia resource display apparatus is provided. The apparatus is applied to a server and includes:

a browsing request receiving module, configured to receive a browsing request sent by a client;

a resource extracting module, configured to extract, from a multimedia resource library, multiple groups of multimedia sub-resources with an association relationship that match the browsing request; and a resource sending module, configured to generate a multimedia resource based on the multiple groups of multimedia sub-resources with an association relationship, and send the multimedia resource to the client.

According to a fifth aspect of the embodiments of this application, a multimedia resource display system is provided, including:

a client and a server, where the client is configured to obtain a browsing instruction submitted by a user, and send a browsing request to the server based on the browsing instruction;

the server is configured to: receive the browsing request; extract, from a multimedia resource library, multiple groups of multimedia sub-resources with an association relationship that match the browsing request; and generate a multimedia resource based on the multiple groups of multimedia sub-resources with an association relationship, and send the multimedia resource to the client; and the client is further configured to: receive the multimedia resource delivered by the server for the browsing request, and generate a browsing page based on the multimedia resource and display the browsing page to the user; when a touch instruction submitted by the user for the browsing page is received, determine multiple multimedia sub-resources with an association relationship from the multimedia resource based on the touch instruction; and generate, based on the multiple multimedia sub-resources, a display page including at least two multimedia sub-resources, and display the display page to the user.

According to a sixth aspect of embodiments of this application, a computing device is provided. The computing device includes a memory, a processor, and computer instructions stored in the memory and capable of running on the processor, where when the processor executes the instructions, the steps of the multimedia resource display method are implemented.

According to a seventh aspect of embodiments of this application, a computer-readable storage medium is provided, where the computer-readable storage medium stores computer instructions, and when the instructions are executed by a processor, the steps of the multimedia resource display method are implemented.

According to an eighth aspect of the embodiments of this application, a computer program product is provided, and when the computer program product is executed in a computer, the computer is enabled to perform the steps of the multimedia resource display method.

According to the multimedia resource display method provided in this application, when the browsing instruction submitted by the user is obtained, the browsing request is sent to the server based on the instruction, and the multimedia resource delivered by the server for the browsing request is received. In this case, the browsing page is generated based on the multimedia resource and is displayed to the user, so that a multimedia resource in which the user is interested is displayed to the user. When the touch instruction submitted by the user for the browsing page is received, the multiple multimedia sub-resources with an association relationship are determined from the multimedia resource based on the touch instruction, and the display page including the at least two multimedia sub-resources is generated based on the multiple multimedia sub-resources and is displayed to the user. This implements that at least two types of multimedia sub-resources with an association relationship can be simultaneously played on a same page, so that the user can accurately determine a progress relationship of the at least two types of multimedia sub-resources with an association relationship. This not only saves time of the user for confirming the progress relationship, but also can simultaneously display the at least two types of multimedia sub-resources to the user, and further improves watching experience of the user, so that the user can select, based on a requirement, a multimedia sub-resource suitable for a watching habit of the user to watch, thereby increasing a user reach rate.

DESCRIPTION OF EMBODIMENTS

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

This application provides two multimedia resource display methods. This application also relates to two multimedia resource display apparatuses, a multimedia resource display system, a computing device, a computer-readable storage medium, and a computer program product. Details are described one by one in the following embodiments.

Figure 1:
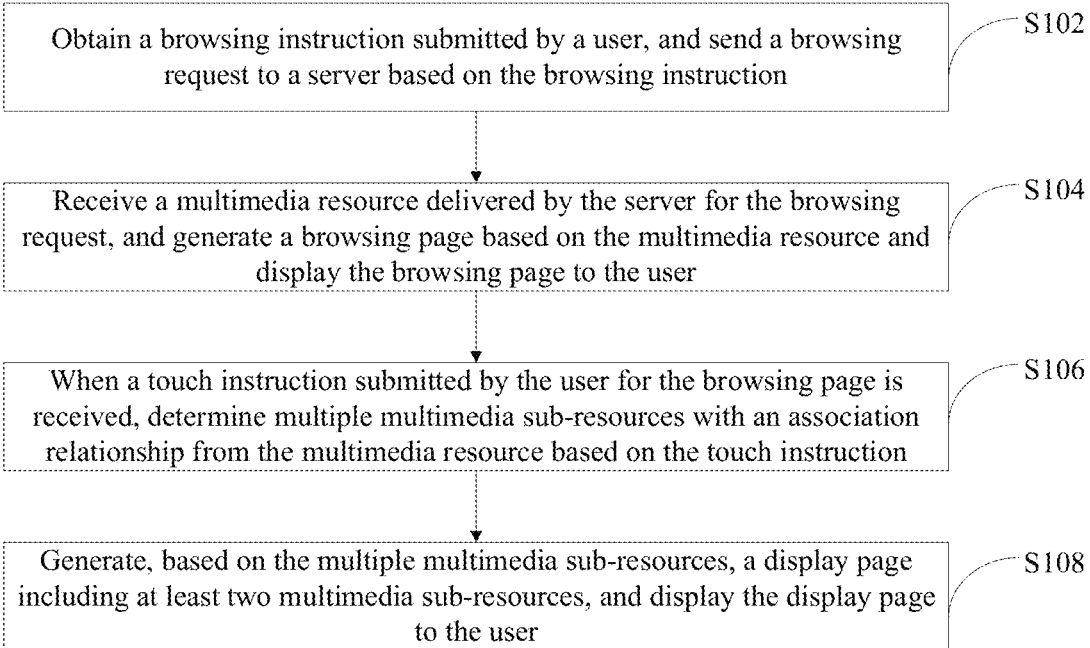
FIG. 1 is a flowchart of a multimedia resource display method according to an embodiment of this application.

FIG. 1 is a flowchart of a multimedia resource display method according to an embodiment of this application. The method is applied to a client computing device, i.e., a client and specifically includes the following steps:

Step 102: Obtain a browsing instruction submitted by a user, and send a browsing request to a server based on the browsing instruction.

Specifically, the multimedia resource display method provided in this embodiment is applied to a client. The client specifically refers to a terminal device held by the user, including but not limited to a mobile phone, a computer, a smartwatch, and the like. In addition, the client is installed with an application for playing a multimedia resource. Correspondingly, the browsing instruction is an instruction submitted by the user after tapping the application installed in the client, and the instruction is an instruction indicating that the user needs to watch a type of multimedia resource. The browsing request specifically is a request for requesting the multimedia resource from the server. The server specifically is a server to which the application installed in the client belongs, and the server may deliver the multimedia resource to the client.

For example, a user A needs to use an application B to watch a cartoon work. After entering a home page of the application B by using a mobile phone, the user may tap a control corresponding to a cartoon item to submit a browsing instruction to determine a cartoon work that the user needs to browse. In this case, a browsing request can be sent based on the browsing instruction to a server corresponding to the application B. That is, the server corresponding to the application B is requested to deliver multimedia resources associated with multiple cartoons to the mobile phone (for example, cartoon work resources separately corresponding to A1, A2, . . . , and An cartoons, a video resource corresponding to the cartoon work (an animation video resource corresponding to the cartoon work), and a cartoon attribute resource), so that the user can browse and select a favorite cartoon work for watching.

Based on this, to improve watching experience of the user and notify the user of a progress relationship of associated multimedia resources, according to the multimedia resource display method provided in this embodiment, a display page generated based on associated multimedia sub-resources is displayed to the user, so that at least two multimedia sub-resources are displayed to the user on a same page. In addition, the at least two multimedia sub-resources match each other. A progress relationship between the multimedia sub-resources can be learned without a need for the user to actively consult, which effectively improves the watching experience of the user.

Further, before the at least two multimedia sub-resources are displayed, the server needs to be requested to deliver the multimedia resource for the user to browse. However, in a process of requesting the multimedia resource, because a work that the user may watch cannot be determined, to provide the user with more choices and provide the user with a historical watching record of the user, the multimedia resource may be requested from the server based on a user identifier of the user. In this embodiment, a specific implementation is as follows:

reading the user identifier of the user based on the browsing instruction; and generating the browsing request based on the user identifier, and sending the browsing request to the server.

Specifically, the user identifier specifically is a unique identifier of the user, which may be an identity account of the user, an account that is logged in to the application of the client, or a device number of the user. Based on this, when the browsing instruction submitted by the user is received, it is determined that the user needs to browse the multimedia resource on the client. In this case, to provide the user with more choices, the user identifier of the user is read based on the browsing instruction, and then the browsing request is generated based on the user identifier and sent to the server, so that the server can determine the multimedia resource that needs to be sent to the client.

The foregoing example is still used. After the browsing instruction of the user A is received, account information of the user A that is logged in the application B is read based on the browsing instruction, and the browsing request is generated based on the account information and sent to the server corresponding to the application B, so that the server corresponding to the application B can determine that the request is from the mobile phone of the user A, and when sending the multimedia resources associated with the multiple cartoons to the application B on the mobile phone of the user A, the server can provide some multimedia resources that can better reach the user A, thereby improving use experience of the user A.

In conclusion, when the browsing request is sent to the server, to effectively reach the user and provide the user with more choices, the browsing request is generated based on the user identifier of the user and sent to the server, so that the server can return the multimedia resource that meets a watching requirement of the user, to improve a probability of reaching the user.

Step 104: Receive the multimedia resource delivered by the server for the browsing request, and generate a browsing page based on the multimedia resource and display the browsing page to the user.

Specifically, based on the foregoing sending a browsing request to a server, the server further sends the multimedia resource to the client based on the browsing request. The multimedia resource includes but is not limited to a video resource, an image resource, an audio resource, a text resource, and the like. It should be noted that, the multimedia resource includes resources delivered for one or more works. The work may be a text work, an image work, a video work, an audio work, or the like, for example, a novel work, a cartoon work, an animation work, or a music work. Correspondingly, the multimedia resource is a video resource, an image resource, an audio resource, a text resource, and/or the like that are/is associated with the work.

Figure 2:
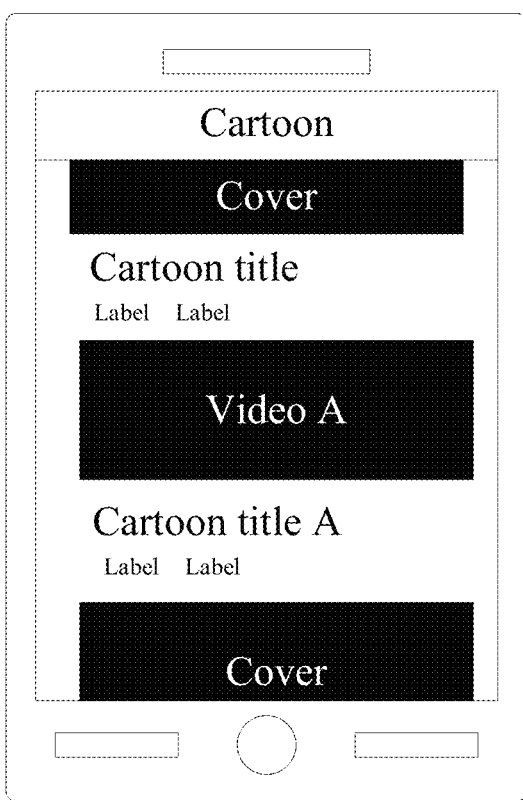
FIG. 2 is a schematic diagram of a browsing page in a multimedia resource display method according to an embodiment of this application.

The browsing page specifically is a page on which related information of the works is provided to the user, so that the user can watch different works and related information of the different works by browsing the page. FIG. 2 is a schematic diagram of a browsing page. After receiving multimedia resources delivered by the server for multiple cartoon works, the client generates the browsing page shown in FIG. 2 based on the multimedia resources, that is, generates the browsing page based on cover information, title information, a work label, a work promotional video, and the like in the multimedia resources, so that the user can learn about the related information of the different cartoon works by browsing the browsing page shown in FIG. 2, to enable the user to preliminarily understand the different works.

In addition, in a process of generating the browsing page based on the multimedia resources, different types of browsing pages may be generated based on different application scenarios. If a browsing page including the video resource is generated, content of each work displayed for the user on the browsing page is a video of specified duration. If a browsing page including the audio resource is generated, content of each work played for the user on the browsing page is audio of specified duration. If a browsing page including the image resource is generated, content of each work displayed for the user on the browsing page is a work cover picture. If a browsing page including the text resource is generated, content of each work displayed for the user on the browsing page is texts with a specified quantity. In addition, to effectively reach the user, a browsing page may be further generated based on a combination of multiple types of multimedia resources, for example, the browsing page is generated after the text resource and the video resource are integrated, so that the user can learn about content of a work by watching a text or a video. In actual application, the browsing page displayed to the user may be set based on an actual application scenario. This is not limited herein in this application.

Further, in a process of displaying the browsing page to the user, to better reach the user and provide the user with richer content to enable the user to perform selection based on a requirement, multiple browsing units may be generated based on the multimedia resource delivered by the server, to generate a browsing page that is convenient for the user to watch. In this embodiment, a specific implementation is as follows:

selecting a target page template from a preset page template library, creating multiple multimedia resource groups based on the multimedia resource, and determining browsing information corresponding to each multimedia resource group; and generating a browsing unit based on the browsing information and a multimedia resource group corresponding to the browsing information, adding the browsing unit to the target page template to generate the browsing page, and displaying the browsing page to the user.

Specifically, the preset page template library specifically refers to a database that stores different page templates. When related data is obtained, the data may be added to the page template according to a page generation protocol, to generate a template displayed to the user.

Correspondingly, the target page template specifically is a page template generating the browsing page. The multiple multimedia resource groups specifically refer to multiple groups of multimedia sub-resources with respective association relationships. Because the display page including the at least two multimedia sub-resources needs to be subsequently displayed to the user, the multimedia resource delivered by the server includes multiple groups of associated multimedia sub-resources. In this case, each group of multimedia resource can be created based on the associated multimedia sub-resources. In addition, each group of multimedia sub-resources corresponds to one work, and the work may have different types of resource, e.g., a video resource, an image resource, a text resource, and/or an audio resource, and these resources may form a group of multimedia resources corresponding to the work.

Further, the browsing unit specifically refers to browsed content corresponding to a work recommended to the user. With reference to the browsing page shown in FIG. 2, all information of each work that can be displayed to the user is one browsing unit, and multiple browsing units may be included on the browsing page displayed to the user.

Based on this, after the multimedia resource delivered by the server for the browsing request is received, in this case, the browsing page displayed to the user needs to be generated based on the multimedia resource. To facilitate watching by the user, first, the target page template is selected from the preset page template library, multiple groups of multimedia sub-resources are also created based on the multimedia resource, and the browsing information corresponding to each group of the multiple multimedia sub-resources. Then, one or more browsing units are generated based on the browsing information corresponding to each group of multimedia sub-resources and each group of multimedia sub-resources corresponding to the browsing information. Finally, the one or more browsing units are added to the target page template, to generate the browsing page to be displayed to the user, and the browsing page is displayed to the user.

In a specific implementation, after the one or more browsing units are added to the target page template, layout adjustment and rendering are further need to be performed on the target page template added with the browsing unit, so that the browsing page can be generated. It should be noted that, layout adjustment refers to adjusting a text size, an information layout, and the like in each browsing unit.

The foregoing example is still used. After receiving the browsing request, the server sends, to the mobile phone end of the user A based on the browsing request, multimedia resources corresponding to 10 cartoon works (A1-A10), where the multimedia resources corresponding to the cartoon works A1-A10 separately include a cover picture resource, a title text resource, a promotional video resource, and the like. Based on this, in this case, to display related information corresponding to the 10 cartoon works to the user, first, a browsing page template is determined, a group of multimedia resource corresponding to each cartoon work is also created based on the multimedia resources, and browsing information of each group of multimedia resource is determined. Then, a browsing unit is generated based on browsing information of each cartoon work and the multimedia resource group corresponding to each cartoon work.

A browsing unit corresponding to the cartoon work A1 includes {title: the cartoon work A1, author: C1, cover: a cover picture of A1, promotion: a promotional video of A1}, . . . , and a browsing unit corresponding to the cartoon work A10 includes {title: the cartoon work A10, author: C10, cover: a cover picture of A10, promotion: a promotional video of A10}. Finally, the browsing unit corresponding to each cartoon work is added to the browsing page template, so that the browsing page can be generated and displayed to the user A by using the mobile phone. Therefore, the user can more conveniently browse the related information of each cartoon work, to select a cartoon that meets a watching requirement for watching.

In addition, after the browsing page is displayed to the user, because a large amount of content is included in the browsing page, the user can turn the browsing page by sliding a screen of the client. When a watching progress of the browsing page by the user reaches a specified progress threshold, the client may request the server to deliver a new multimedia resource again. Then, the client updates the browsing page based on the new multimedia resource, so that the user can continue to browse another work. In actual application, the progress threshold may be set based on an actual application scenario. The progress threshold may be set to a browsing percentage of the browsing page, for example, when a browsing progress reaches 80%, the server may be requested to deliver the new multimedia resource. Alternatively, the progress threshold may be set to a quantity of browsing units that are browsed in the browsing page, for example, when the quantity of browsing units that are browsed reaches 8, the server may be requested to deliver the new multimedia resource. In actual application, the progress threshold may be set based on an actual scenario. This is not limited herein in this application.

In conclusion, the browsing unit is generated by creating the multimedia resource group and determining the browsing information, so that the browsing page can be quickly generated by matching the target page template, thereby effectively increasing a speed of displaying the browsing page to the user. In addition, the browsing page is generated in the foregoing manner, which can be more convenient for watching by the user, thereby improving watching experience of the user.

Step 106: When a touch instruction submitted by the user for the browsing page is received, determine multiple multimedia sub-resources with an association relationship from the multimedia resource based on the touch instruction.

Specifically, based on the foregoing displaying the browsing page to the user, further, when the touch instruction submitted by the user for the browsing page is received, it indicates that the user is interested in content of a work in the browsing page, and submits the touch instruction for the content. To facilitate subsequent displaying of related content to the user, in this case, the multiple multimedia sub-resources with an association relationship can be determined from the multimedia resource based on the touch instruction.

The touch instruction is a tap instruction or a stay instruction. The tap instruction is generated when the user taps the browsing page, for example, the user taps on a screen area corresponding to display content of a work in the browsing page, and in this case, the tap instruction is generated as the touch instruction. The stay instruction is generated when duration in which the browsing page is not tapped exceeds a preset duration threshold, for example, after the user slides display content of a work to a center of a screen, the content of the work does not move beyond specified duration, in this case, the stay instruction is generated as the touch instruction. In this case, it can be preliminarily determined, based on the touch instruction, that the currently selected work is a work in which the user is interested. Subsequently, multiple multimedia sub-resources with an association relationship that correspond to the work may be determined from the multimedia resource, to generate a display page and display the display page to the user.

Correspondingly, the multimedia sub-resource specifically is a single type of multimedia resource, for example, a video resource, an image resource, a text resource, or an audio resource. Correspondingly, the multiple multimedia sub-resources with an association relationship specifically are multiple multimedia sub-resources that belong to a same work, for example, a video resource, a text resource, and an image resource corresponding to the cartoon work A1 may be understood as the multiple multimedia sub-resources with an association relationship. It should be noted that, the association relationship refers to not only a same work, but also that progress relationships of the multiple multimedia sub-resources of the same work are associated, that is, the progresses of the multiple multimedia sub-resources are similar or the same.

Based on this, that the touch instruction is received may indicate that the user is interested in currently displayed content, and then the multiple multimedia sub-resources with an association relationship may be determined from the multimedia resource based on the touch instruction, so that the display page can be subsequently generated based on the multiple multimedia sub-resources and displayed to the user. It should be noted that the multiple multimedia sub-resources belong to the same work.

Further, to reduce resources consumed in a transmission process, when delivering the multimedia resource, the server may also deliver, to the client, a part of associated multimedia sub-resources corresponding to each work. In this case, the client can directly determine, from the multimedia resource, multiple multimedia sub-resources with an association relationship that correspond to the work in which the user is interested. In this embodiment, a specific implementation is as follows:

determining a target multimedia sub-resource from the multimedia resource based on the touch instruction, and displaying the target multimedia sub-resource to the user by using the browsing page;

when a selection instruction submitted by the user by using the browsing page is received, determining, from the multimedia resource, an associated multimedia sub-resource that has an association relationship with the target multimedia sub-resource; and determining the multiple multimedia sub-resources with an association relationship based on the target multimedia sub-resource and the associated multimedia sub-resource.

Specifically, the target multimedia sub-resource specifically is the multimedia sub-resource corresponding to the work in which the user is interested. The selection instruction specifically is an instruction generated when the user taps the work twice. Correspondingly, the associated multimedia sub-resource specifically is another multimedia sub-resource in multimedia sub-resources corresponding to the works in which the user is interested other than the target multimedia sub-resource.

Based on this, when the user submits the touch instruction, it indicates that the user has an intention of interest in a work displayed on a current browsing page, and the intention may only be from promotional content displayed on the browsing page. In this case, to effectively reach the user, content display may be performed in a progressive manner. That is, the target multimedia sub-resource is determined from the multimedia resource based on the touch instruction, and the target multimedia sub-resource is displayed to the user by using the browsing page. If the selection instruction submitted by the user by using the browsing page is received, it indicates that the user has a strong interest in a work corresponding to the target multimedia sub-resource. In this case, the associated multimedia sub-resource that has an association relationship with the target multimedia sub-resource can be determined from the multimedia resource. Finally, the multiple multimedia sub-resources with an association relationship can be determined based on the target multimedia sub-resource and the associated multimedia sub-resource, to subsequently generate the display page and display the display page to the user.

The foregoing example is still used. Based on that promotional information corresponding to the cartoon works A1-A10 is displayed to the user A by using the browsing page, when a touch instruction submitted by the user A for the browsing page is received, it is further determined that the user is interested in the cartoon work A2. In this case, the cover picture resource, the title text resource, the promotional video resource, and the like of the cartoon work A2 can be determined from the multimedia resource delivered by the server. Then, the promotional video resource is selected and played to the user by using the browsing page.

If a selection instruction submitted by the user A for the browsing page is received, it is determined that the user has a strong interest in the cartoon work A2. Subsequently, the display page may be generated based on the cartoon work A2 and is displayed to the user A. However, before this, to display, to the user, multiple types of multimedia sub-resources with a same progress that are about the cartoon work A2, associated multimedia sub-resources associated with the promotional video resource may be selected from all multimedia resources delivered by the server, that is, other multimedia sub-resources corresponding to the cartoon work A2 are selected from the multimedia resources. The other multimedia sub-resources corresponding to the cartoon work A2 include an image resource of a $10^{th}$ file of the cartoon work A2 and an animation video resource of a $5^{th}$ episode, and the image resource of the $10^{th}$ file of the cartoon work A2 and the animation video resource of the $5^{th}$ episode have a same progress.

In conclusion, when delivering the multimedia resource, the server also delivers the associated multimedia sub-resource to the client, which can effectively reduce time of subsequently determining the multiple multimedia sub-resources with an association relationship, to improve efficiency of subsequently generating the display page.

In addition, to avoid a waste of a transmitted multimedia resource that is not browsed by the user, when the user submits the selection instruction for the browsing page, the server may be requested to deliver the associated multimedia sub-resource. In this embodiment, a specific implementation is as follows:

determining a target multimedia sub-resource from the multimedia resource based on the touch instruction, and displaying the target multimedia sub-resource to the user by using the browsing page;

when a selection instruction submitted by the user by using the browsing page is received, sending an associated resource request to the server based on the selection instruction; and receiving an associated multimedia sub-resource delivered by the server for the associated resource request, and determining the multiple multimedia sub-resources based on the target multimedia sub-resource and the associated multimedia sub-resource.

Specifically, when the user submits the touch instruction, it indicates that the user has an intention of interest in a work displayed on a current browsing page, and the intention may only be from promotional content displayed on the browsing page. In this case, to effectively reach the user, content display may be performed in a progressive manner. That is, the target multimedia sub-resource is determined from the multimedia resource based on the touch instruction, and the target multimedia sub-resource is displayed to the user by using the browsing page. If the selection instruction submitted by the user by using the browsing page is received, it indicates that the user has a strong interest in a work corresponding to the target multimedia sub-resource. In this case, the associated resource request can be sent to the server based on the selection instruction, and the associated multimedia sub-resource delivered by the server for the associated resource request is received. Finally, the multiple multimedia sub-resources with an association relationship can be determined based on the target multimedia sub-resource and the associated multimedia sub-resource, to subsequently generate the display page and display the display page to the user.

The foregoing example is still used. Based on that promotional information corresponding to the cartoon works A1-A10 is displayed to the user A by using the browsing page, when a touch instruction submitted by the user A for the browsing page is received, it is further determined that the user is interested in the cartoon work A2. In this case, the cover picture resource, the title text resource, the promotional video resource, and the like of the cartoon work A2 can be determined from the multimedia resource delivered by the server. Then, the promotional video resource is selected and played to the user by using the browsing page.

If a selection instruction submitted by the user A for the browsing page is received, it is determined that the user has a strong interest in the cartoon work A2. Subsequently, the display page may be generated based on the cartoon work A2 and is displayed to the user A. However, before this, to display, to the user, multiple types of multimedia sub-resources with a same progress that are about the cartoon work A2, other types of multimedia sub-resources of the cartoon work A2 may be requested from the server, and the other types of multimedia sub-resources of the cartoon work A2 delivered by the server are received. The other multimedia sub-resources include an image resource of a $10^{th}$ file of the cartoon work A2 and an animation video resource of a $5^{th}$ episode, and the image resource of the $10^{th}$ file of the cartoon work A2 and the animation video resource of the $5^{th}$ episode have a same progress.

In conclusion, after the selection instruction submitted by the user is received, the associated resource request is sent to the server based on the selection instruction. This implements that the server is requested to deliver a corresponding multimedia sub-resource only when the user needs the associated multimedia sub-resource, thereby avoiding a resource waste problem caused by sending the multimedia sub-resources in advance.

Step 108: Generate, based on the multiple multimedia sub-resources, a display page including at least two multimedia sub-resources, and display the display page to the user.

Specifically, based on obtaining of the multiple multimedia sub-resources with an association relationship, to facilitate watching by the user and notifying the user of a progress relationship between multimedia sub-resources of different types without a need for the user to consult, the at least two multimedia sub-resources are further selected from the multiple multimedia sub-resources and displayed by using the display page, so that at least two types of multimedia sub-resources can be displayed on the display page. In addition, progresses of the at least two displayed multimedia sub-resources are the same. The display page specifically is a page that can display the at least two types of multimedia sub-resources.

It should be noted that, a player that matches a type of the multimedia sub-resource is configured on the display page. If an animation video and a cartoon work may be displayed on the display page, the display page includes a video player and an image player, where the video player is configured to play an animation video, and the image player is configured to display a cartoon work. Alternatively, if an animation video and a novel work may be displayed on the display page, the display page includes a video player and a text reader, where the video player is configured to play an animation video, and the text reader is configured to display the novel work. Alternatively, an animation video, a cartoon work, and a novel work may be set to be simultaneously displayed on the display page. In actual application, a quantity of multimedia sub-resources displayed on the display page may be set based on an actual application scenario. This is not limited herein in this application.

In a specific implementation, to facilitate a user operation, corresponding operation components, such as a play component, a pause component, a progress bar component, and a slide component, may be provided for the video player, the image player, an audio player, and the text reader.

Further, in a process of generating the display page, the display page needs to display the at least two types of multimedia sub-resources. Therefore, to facilitate watching by the user, the display page can be adjusted according to a page layout rule. In this embodiment, a specific implementation is as follows:

obtaining an initial display page, and determining a page layout rule of the initial display page;

selecting, from the multiple multimedia sub-resources, the at least two multimedia sub-resources that match the page layout rule; and adding the at least two multimedia sub-resources to the initial display page, and generating the display page based on an addition result.

Specifically, the initial display page specifically is a page exists before a multimedia sub-resource is added. Correspondingly, the page layout rule specifically is a rule for adding/adjusting a multimedia sub-resource. Based on this, first, the initial display page is obtained, and the page layout rule of the initial display page is also determined. Then, the at least two multimedia sub-resources that match the page layout rule are selected from the multiple multimedia sub-resources. Finally, the at least two multimedia sub-resources are added to the initial display page to generate the display page.

Figure 3:
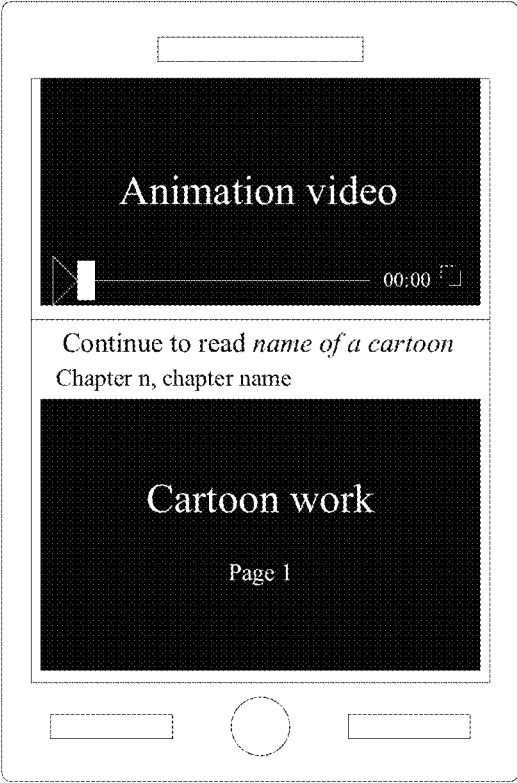
FIG. 3 is a schematic diagram of a display page in a multimedia resource display method according to an embodiment of this application.

In actual application, if the display page is set, according to the page layout rule, to be capable of displaying two types of multimedia sub-resources, when the multimedia sub-resources are selected, two multimedia sub-resources may be selected from the multiple multimedia sub-resources, and types of the two selected multimedia sub-resources are the same as types of the resources that can be displayed on the display page. If the animation video and the cartoon work may be played on the display page, the at least two multimedia sub-resources selected from the multiple multimedia sub-resources are a video resource and an image resource. A finally generated display page is shown in FIG. 3, which implements playing the animation video on the top of the screen, and playing the cartoon work at the bottom of the screen.

The foregoing example is still used. After the image resource of the $10^{th}$ file of the cartoon work A2 and the animation video resource of the $5^{th}$ episode are determined, first, an initial display page of the application B is obtained, and it is determined that a page layout rule of the initial display page is to play a video resource and display an image resource. Then, the image resource of the $10^{th}$ file of the cartoon work A2 is added to an image player of the initial display page, and the animation video resource of the $5^{th}$ episode of the cartoon work A2 is added to a video player of the initial display page. The display page may be generated based on the addition result and displayed to the user.

In conclusion, the at least two multimedia sub-resources are displayed on a same page, so that not only it is convenient for the user to watch, but also a progress relationship of the at least two multimedia sub-resources can be notified to the user, thereby effectively saving time of the user for querying the progress relationship of the at least two multimedia sub-resources, providing multiple watching manners for the user, and further improving watching experience of the user.

In addition, after the display page that includes the at least two multimedia sub-resources is displayed to the user, if the user needs to further watch the multimedia sub-resources, any one manner may be selected for watching. In this embodiment, a specific implementation is as follows:

when a watching instruction submitted by the user for the display page is received, determining, from the at least two multimedia sub-resources, a to-be-displayed multimedia sub-resource corresponding to the watching instruction; and generating a resource display page based on the to-be-displayed multimedia sub-resource, and displaying the resource display page to the user.

Specifically, the watching instruction specifically is an instruction submitted when the user watches any type of multimedia sub-resource. The to-be-displayed multimedia sub-resource specifically is a multimedia sub-resource that the user needs to watch. Correspondingly, the resource display page specifically is a page for displaying the to-be-displayed multimedia sub-resource.

Figure 4:
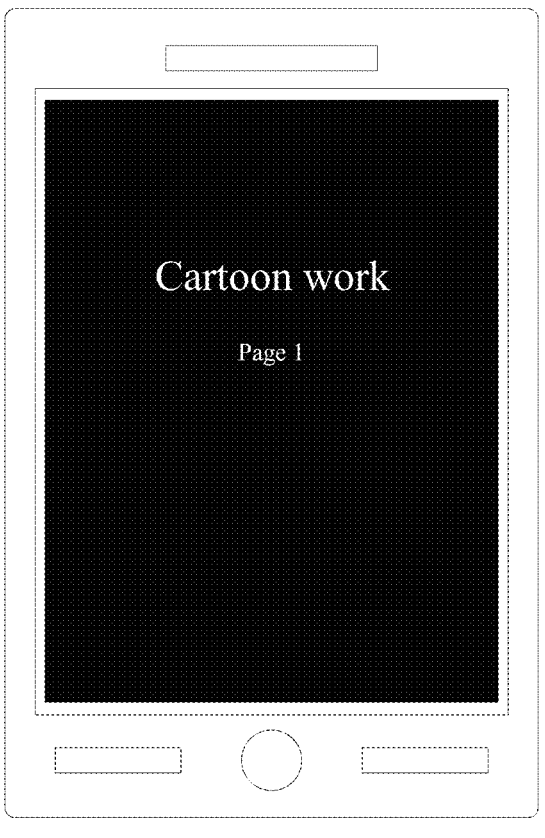
FIG. 4 is a schematic diagram of a resource display page in a multimedia resource display method according to an embodiment of this application.

Based on this, when the watching instruction submitted by the user for the display page is received, it indicates that the user selects one type of sub-multimedia resource in the display page to watch. To provide better watching experience for the user, in this case, the to-be-displayed multimedia sub-resource corresponding to the watching instruction is determined from the at least two multimedia sub-resources, and the resource display page is generated based on the to-be-displayed multimedia sub-resource and displayed to the user. That is, when the user taps the cartoon work in FIG. 3, it is determined that the user needs to watch the cartoon work. In this case, a resource corresponding to the cartoon work may be selected to generate a resource display page shown in FIG. 4, and the display page is displayed to the user by using the client.

In actual application, because the display page may include the video player or the audio player, if the display page jumps to the resource display page in this case, the video player or the audio player on the display page may further continue playing corresponding content. To avoid disturbing the user in a watching process, the display page may be closed after jumping to the resource display page. Alternatively, the video player or the audio player on the display page may be paused, to avoid disturbing the user to watch the resource display page.

In a specific implementation, the to-be-displayed multimedia sub-resource may be a video resource or an image resource. Correspondingly, a video playback page may be generated based on the video resource, or an image display page may be generated based on the image resource.

The foregoing example is still used. When the user taps the image resource corresponding to the cartoon work A2 in the display page, that is, it is determined that the user needs to watch the image resource of the $10^{th}$ file of the cartoon work A2 in this case, the image display page is generated based on the image resource of the $10^{th}$ file and displayed to the user A by using the mobile phone, and the video resource corresponding to the cartoon work A2 in the display page is simultaneously released, so that the user can watch the cartoon work A2 while the user can be prevented from being disturbed by the video resource of the display page.

In conclusion, the user is provided with a permission to submit instructions multiple times, so that the user can select, based on a requirement, a comfortable manner to watch the multimedia sub-resource, which not only provides multiple watching manners for the user, but also further improves watching experience of the user.

In addition, because the at least two multimedia sub-resources displayed on the display page are associated with each other, to facilitate watching by the user, a jump node can be set, so that when a playback progress of any one of the at least two multimedia sub-resources reaches a preset jump node, the display page is updated based on the at least two multimedia sub-resources, and an updated display page is displayed to the user.

The foregoing example is still used. When the image resource of the $10^{th}$ file of the cartoon work A2 and the animation video resource of the $5^{th}$ episode are displayed on the display page, to facilitate the user to watch the cartoon work A2, page turning can be automatically performed on the image resource when the video resource triggers the jump node, thereby implementing synchronizing playback of the video resource and the image resource, and improving watching experience of the user.

In conclusion, setting the jump node can maintain the display progress of the at least two multimedia sub-resources, so that when the user watches any multimedia resource by using the display page, the other one or more multimedia sub-resources also follow, thereby saving a user active operation.

According to the multimedia resource display method provided in this application, when the browsing instruction submitted by the user is obtained, the browsing request is sent to the server based on the instruction, and the multimedia resource delivered by the server for the browsing request is received. In this case, the browsing page is generated based on the multimedia resource and is displayed to the user, so that a multimedia resource in which the user is interested is displayed to the user. When the touch instruction submitted by the user for the browsing page is received, the multiple multimedia sub-resources with an association relationship are determined from the multimedia resource based on the touch instruction, and the display page including the at least two multimedia sub-resources is generated based on the multiple multimedia sub-resources and is displayed to the user. This implements that at least two types of multimedia sub-resources with an association relationship can be simultaneously played on the same page, so that the user can accurately determine a progress relationship of the at least two types of multimedia sub-resources with an association relationship. This not only saves time of the user for confirming the progress relationship, but also can simultaneously display the at least two types of multimedia sub-resources to the user, and further improves watching experience of the user, so that the user can select, based on a requirement, a multimedia sub-resource suitable for a watching habit of the user to watch, thereby increasing a user reach rate.

Figure 5:
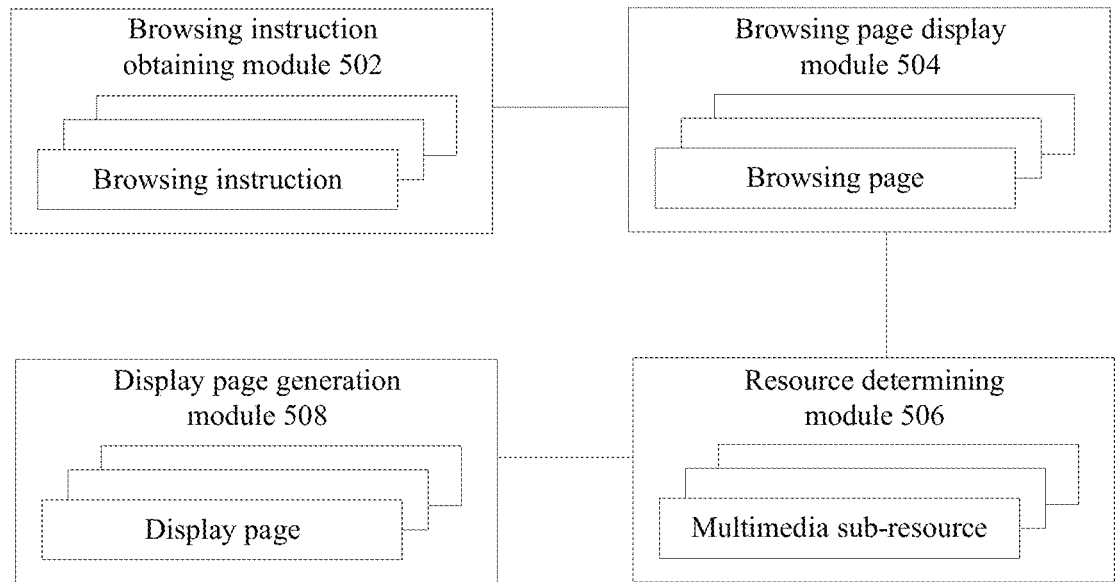
FIG. 5 is a schematic diagram of a structure of a multimedia resource display apparatus according to an embodiment of this application.

Corresponding to the foregoing method embodiments, this application further provides an embodiment of a multimedia resource display apparatus. FIG. 5 is a schematic diagram of a structure of a multimedia resource display apparatus according to an embodiment of this application. As shown in FIG. 5, the apparatus is applied to a client and includes:

a browsing instruction obtaining module 502, configured to obtain a browsing instruction submitted by a user, and send a browsing request to a server based on the browsing instruction;

a browsing page display module 504, configured to receive a multimedia resource delivered by the server for the browsing request, and generate a browsing page based on the multimedia resource and display the browsing page to the user;

a resource determining module 506, configured to: when a touch instruction submitted by the user for the browsing page is received, determine multiple multimedia sub-resources with an association relationship from the multimedia resource based on the touch instruction; and a display page generation module 508, configured to generate, based on the multiple multimedia sub-resources, a display page including at least two multimedia sub-resources, and display the display page to the user.

In an optional embodiment, the browsing instruction obtaining module 502 is further configured to:

read a user identifier of the user based on the browsing instruction; and generate the browsing request based on the user identifier, and send the browsing request to the server.

In an optional embodiment, the browsing page display module 504 is further configured to:

select a target page template from a preset page template library; and generate the browsing page based on the target page template and the multimedia resource, and display the browsing page to the user.

In an optional embodiment, the browsing page display module 504 is further configured to:

create multiple multimedia resource groups based on the multimedia resource, and determine browsing information corresponding to each multimedia resource group; and generate a browsing unit based on the browsing information and a multimedia resource group corresponding to the browsing information, and add the browsing unit to the target page template to generate the browsing page.

In an optional embodiment, the touch instruction is a tap instruction or a stay instruction, the tap instruction is generated when the user taps the browsing page, and the stay instruction is generated when duration in which the browsing page is not tapped exceeds a preset duration threshold.

In an optional embodiment, the resource determining module 506 is further configured to:

determine a target multimedia sub-resource from the multimedia resource based on the touch instruction, and display the target multimedia sub-resource to the user by using the browsing page; when a selection instruction submitted by the user by using the browsing page is received, determine, from the multimedia resource, an associated multimedia sub-resource that has an association relationship with the target multimedia sub-resource; and determine the multiple multimedia sub-resources with an association relationship based on the target multimedia sub-resource and the associated multimedia sub-resource.

In an optional embodiment, the resource determining module 506 is further configured to:

determine a target multimedia sub-resource from the multimedia resource based on the touch instruction, and display the target multimedia sub-resource to the user by using the browsing page; when a selection instruction submitted by the user by using the browsing page is received, send an associated resource request to the server based on the selection instruction; and receive an associated multimedia sub-resource delivered by the server for the associated resource request, and determine the multiple multimedia sub-resources based on the target multimedia sub-resource and the associated multimedia sub-resource.

In an optional embodiment, the display page generation module 508 is further configured to:

obtain an initial display page, and determine a page layout rule of the initial display page; select, from the multiple multimedia sub-resources, the at least two multimedia sub-resources that match the page layout rule; and add the at least two multimedia sub-resources to the initial display page, and generate the display page based on an addition result.

In an optional embodiment, the multimedia resource display apparatus further includes:

a determining module, configured to: when a watching instruction submitted by the user for the display page is received, determine, from the at least two multimedia sub-resources, a to-be-displayed multimedia sub-resource corresponding to the watching instruction; and generate a resource display page based on the to-be-displayed multimedia sub-resource, and display the display page to the user.

In an optional embodiment, the to-be-displayed multimedia sub-resource is a video resource or an image resource.

Correspondingly, the determining module is further configured to generate a video playback page based on the video resource, or generate an image display page based on the image resource.

In an optional embodiment, the multimedia resource display apparatus further includes:

an updating module, configured to: when a playback progress of any one of the at least two multimedia sub-resources reaches a preset jump node, update the display page based on the at least two multimedia sub-resources, and display an updated display page to the user.

In conclusion, when the browsing instruction submitted by the user is obtained, the browsing request is sent to the server based on the instruction, and the multimedia resource delivered by the server for the browsing request is received. In this case, the browsing page is generated based on the multimedia resource and is displayed to the user, so that a multimedia resource in which the user is interested is displayed to the user. When the touch instruction submitted by the user for the browsing page is received, the multiple multimedia sub-resources with an association relationship are determined from the multimedia resource based on the touch instruction, and the display page including the at least two multimedia sub-resources is generated based on the multiple multimedia sub-resources and is displayed to the user. This implements that at least two types of multimedia sub-resources with an association relationship can be simultaneously played on a same page, so that the user can accurately determine a progress relationship of the at least two types of multimedia sub-resources with an association relationship. This not only saves time of the user for confirming the progress relationship, but also can simultaneously display the at least two types of multimedia sub-resources to the user, and further improves watching experience of the user, so that the user can select, based on a requirement, a multimedia sub-resource suitable for a watching habit of the user to watch, thereby improving user reach rate.

The foregoing describes a schematic solution of the multimedia resource display apparatus according to this embodiment. It should be noted that the technical solution of the multimedia resource display apparatus and the technical solution of the multimedia resource display method belong to a same concept. For details not described in detail in the technical solution of the multimedia resource display apparatus, refer to the descriptions of the technical solution of the multimedia resource display method.

Figure 6:
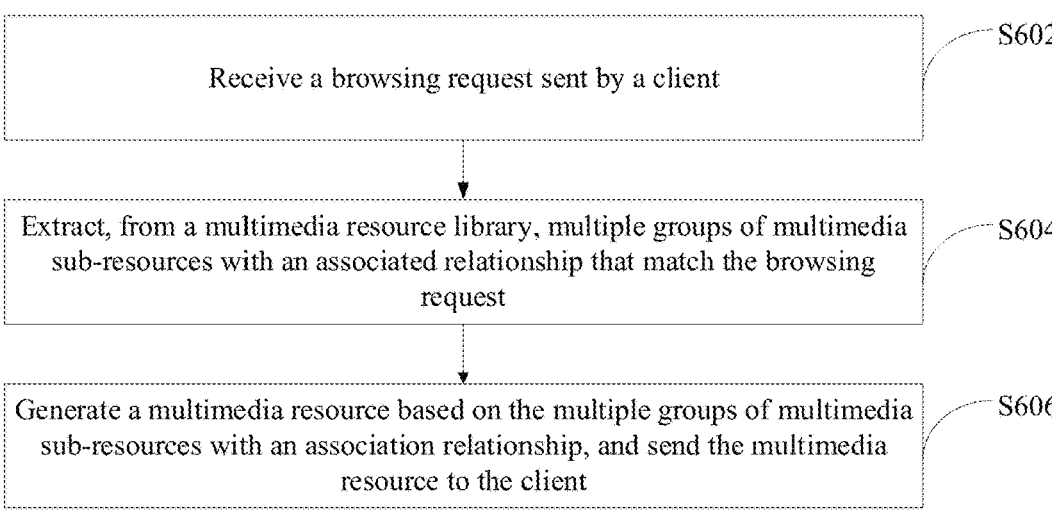
FIG. 6 is a flowchart of another multimedia resource display method according to an embodiment of this application.

This application further provides another multimedia resource display method. FIG. 6 is a flowchart of another multimedia resource display method according to an embodiment of this application. The method is applied to a server and specifically includes the following steps:

Step 602: Receive a browsing request sent by a client.

Specifically, the another multimedia resource display method provided in this embodiment is applied to the server. In addition, the multimedia resource display method applied to the server corresponds to the foregoing multimedia resource display method applied to the user client. For execution content of the server, refer to this embodiment. For execution content of the client, refer to the foregoing embodiment. Same or similar content is not described herein in this application. Correspondingly, the server specifically is a server to which an application installed in the client belongs, and the server can deliver a multimedia resource to the client.

Based on this, to display at least two multimedia sub-resources on a same page, and to implement that a progress relationship of the at least two multimedia sub-resources can be actively notified to a user, the server needs to perform association processing on multimedia sub-resources in advance, that is, associate multiple multimedia sub-resources of a same work, and ensure that progresses of the multiple associated multimedia sub-resources are the same or similar, so that multimedia sub-resources displayed by the client have a corresponding association relationship, and it is more convenient for the user to understand a progress relationship between at least two multimedia sub-resources of the same work.

Further, because the multimedia sub-resources with an association relationship needs to be provided to the client, the server needs to associate the multimedia sub-resources in advance. In this embodiment, a process in which the server associates the multimedia sub-resources is as follows:

associating the multimedia sub-resources, and configuring a resource identifier for the multimedia sub-resources with an association relationship; and storing the multimedia sub-resources with the resource identifier into a library of multimedia resources.

Specifically, the resource identifier specifically is an identifier added to the associated multimedia sub-resources. The multiple multimedia sub-resources with an association relationship can be quickly extracted from the multimedia resource library by using the resource identifier. Correspondingly, the multimedia resource library specifically refers to a database that stores various types of multimedia sub-resources, and the database may be divided into areas based on different types of multimedia sub-resources, so that multimedia sub-resources stored in each area are the same, thereby facilitating extracting the multimedia sub-resource.

Based on this, to provide the client with the multimedia sub-resources with an association relationship, the server needs to perform association processing on the multimedia sub-resources in advance. In addition, to facilitate subsequent quick feedback on the browsing request of the client, the resource identifier is configured for the multimedia sub-resources with an association relationship, to enable the progresses to be the same or similar. In addition, the multimedia sub-resources with an association relationship have a same resource identifier, so that when the multimedia resource is fed back based on the browsing request, different types of multiple multimedia sub-resources of a same work (progresses of the multimedia sub-resources are the same or similar) can be extracted based on the resource identifier to feed back to the client, and the client can display the at least two multimedia sub-resources on the same page to the user.

Finally, the multimedia sub-resources with the resource identifier are stored in the multimedia resource library.

In actual application, before the multimedia sub-resources are associated, the multiple multimedia sub-resources of the same work need to be obtained to implement association. In addition, to provide the user with more comprehensive information, when obtaining the multimedia sub-resources, it includes but is not limited to obtaining a title, an introduction, a producer, a related multimedia sub-resource, and the like of the work. If the work is an animation video, the multiple multimedia sub-resources obtained in this case include but are not limited to a title, an introduction, a producer, a title of a single episode, and a video file of a single episode of an animation work, and a cartoon work with a same plot as the animation video, and may further include a title, an introduction, a producer, a title of a single file, a picture file of a single file, and the like of the cartoon work.

Further, in a process of associating the multimedia sub-resources, to improve association processing efficiency of associating the multimedia sub-resources, the multimedia sub-resources may be associated by comparing field information and/or key frames. In this embodiment, a specific implementation is as follows:

obtaining field information of the multimedia sub-resources, and associating the multimedia sub-resources based on the field information; and/or obtaining key frames of the multimedia sub-resources, and associating the multimedia sub-resources based on the key frames.

Specifically, the field information is information corresponding to texts included in the multimedia sub-resources, such as a line of a role in the animation video, a text in the cartoon work, and a text obtained by converting audio in an audio work. The key frame refers to frame information extracted from the multimedia sub-resources, and may be a frame of an image in the animation video, a cartoon image in the cartoon work, an audio frame of specified duration in the audio work, a piece of text in a text work, or the like.

Based on this, the associating the multimedia sub-resources based on the field information specifically refers to: extracting field information of the multimedia sub-resources, and matching the field information; and if there is same field information, determining that the multimedia sub-resources to which the field information belongs have a high association degree. In this case, a prompt can be given, to facilitate associating the multimedia sub-resources with the same field information. In addition, because types of the multimedia sub-resources are complex, there may be a problem of omission if the multimedia sub-resources are associated only based on the field information. To prevent the problem from reducing association efficiency of the multimedia sub-resources, the multimedia sub-resources may be further associated based on the key frames of the multimedia sub-resources. Specifically, the key frames of the multimedia sub-resources are extracted, and then a similarity between the key frames is calculated. Finally, multimedia sub-resources to which key frames with a high similarity belong may be selected to form the multiple multimedia sub-resources with an association relationship.

In a specific implementation, the multiple multimedia sub-resources of the same work may be greatly modified. For example, after the cartoon work is adapted to the animation video, to improve a viewing effect of the animation video, in addition to that main content thereof is the same as that of the cartoon work, some other content is also added, to improve richness of the animation video. In this case, to associate the cartoon work with the animation video, association processing may be performed by calculating the similarity of the key frames. That is, after a key frame in the animation video is extracted at an equal unit of time, similarity calculation is performed with a cartoon picture resource of the cartoon work. If a similarity calculation result is greater than a preset similarity threshold, it indicates that the animation video and the cartoon work belong to a same work, and the two have an association relationship. In this case, the animation video and the cartoon work can be added with a same resource identifier, and are stored in the multimedia resource library, thereby facilitating subsequent feedback to the client.

In addition, in a process of associating the multimedia sub-resources, to improve watching experience of using the client to watch the multimedia sub-resources, the server may associate the multimedia sub-resources based on different association granularities, to process multimedia sub-resources of different progress in different association manners. In this embodiment, a specific implementation is as follows:

associating the multimedia sub-resources based on a preset association granularity, where the association granularity correspondingly includes at least one of the following: a time association granularity, a playback association granularity, and an attribute association granularity.

Specifically, the association granularity specifically is a degree of fineness used to associate the multimedia sub-resources, and the association granularity includes but is not limited to the time association granularity, the playback association granularity, and the attribute association granularity. The time association granularity specifically refers to associating the multimedia sub-resources based on a granularity of a time level. The playback association granularity specifically refers to associating the multimedia sub-resources based on a granularity of a playback progress. The attribute association granularity specifically refers to associating the multimedia sub-resources based on popularity of playing content.

Based on this, after the multimedia sub-resources are associated based on the preset association granularity, when the client displays the at least two multimedia sub-resources, the multimedia sub-resources in the display page can jump based on the preset association granularity. For example, the cartoon work automatically turns a page based on a playback progress of the animation video, and a novel work automatically turns a page based on a playback progress of an audio resource. That is, a multimedia sub-resource associated based on the time association granularity automatically completes a page turning operation and/or a jump operation as time increases. For example, every time the animation video is played for 10 s, a cartoon work on a same page automatically turns to a next page. A multimedia sub-resource associated based on the playback association granularity automatically completes a page turning operation and/or a jump operation as a playback progress increases. For example, when a playback progress of the animation video reaches 10%, a cartoon work on a same page automatically turns to a next page. A multimedia sub-resource associated based on the attribute association granularity automatically completes a page turning operation and/or a jump operation based on popularity of resource content. For example, when the animation video is played to a most popular part of this episode animation, a cartoon automatically turns and jumps to a cartoon image that is the same as a playback picture of the animation video. Therefore, when the at least two multimedia sub-resources are played on the same page, the at least two multimedia sub-resources can be automatically played, thereby ensuring that playback progresses of the at least two multimedia sub-resources are the same or similar, and improving watching experience of the user.

For example, the server obtains a cartoon work A1 and an animation video C1, and the cartoon work A1 and the animation video C1 belong to a same work. The cartoon A1 includes 100 files of image resources, and the animation video C1 includes 200 episodes of video resources. Based on this, image field information corresponding to the 100 files of image resources, video field information corresponding to the 200 episodes of video resources, image key frames corresponding to the 100 files of image resources, and video key frames corresponding to the 200 episodes of video resources are extracted. In this case, the image field information is compared with the video field information, and a similarity between each image key frame and each video key frame is calculated. Based on a comparison result and a similarity calculation result, it is determined that a $1^{st}$ file of image resource is equivalent to a plot progress of $1^{st}$ to $4^{th}$ episodes of video resources, a $2^{nd}$ file of image resource is equivalent to a plot progress of $5^{th}$ to $8^{th}$ episodes of video resources, . . . , and a $50^{th}$ file of image resource is equivalent to a plot progress of $197^{th}$ to $200^{th}$ episodes of video resources.

Based on this, it is determined in this case that the $1^{st}$ to $50^{th}$ files of image resources of the cartoon work are the same as a plot progress of the $1^{st}$ to $200^{th}$ episodes of video resources of the animation video. To facilitate subsequently sending the cartoon work and the animation video that are associated to the client, in this case, resource identifiers are configured for the image resources and the video resources based on the foregoing playback progress relationship. That is, a resource identifier ID_1 is configured for the $1^{st}$ file of image resource and the $1^{st}$ to $4^{th}$ episodes of video resources, a resource identifier ID_2 is configured for the $2^{nd}$ file of image resource and the $5^{th}$ to $8^{th}$ episodes of video resources, . . . , and a resource identifier ID_50 is configured for the $50^{th}$ file of image resource and the $197^{th}$ to $200^{th}$ episodes of video resources. Then, the image resource and the video resource that have an association relationship are stored in the multimedia resource library, to subsequently feed back the multimedia resource to the client based on the browsing request. In addition, to facilitate the server to extract the multimedia resource, the resource identifier is stored.

In conclusion, association processing of the multimedia sub-resources is completed with assistance of the field information and the key frames. This not only can improve association efficiency of the multimedia sub-resources, but also can ensure association precision of the multimedia sub-resources, so that a multimedia resource with a high association degree can be subsequently sent to the client, to improve watching experience of the user for watching the at least two multimedia sub-resources on the client.

Step 604: Extract, from the multimedia resource library, multiple groups of multimedia sub-resources with respective association relationships that match the browsing request.

Specifically, based on the foregoing received browsing request, it is further indicated that in this case, the user of the client needs to browse the multimedia resource. To increase a probability of reaching the user, the multiple groups of multimedia sub-resources with the respective association relationships that match the browsing request are extracted from the multimedia resource library. The multiple groups of multimedia sub-resources with the respective association relationships specifically are multimedia sub-resources corresponding to each of multiple works. For example, if multimedia sub-resources corresponding to the cartoon work A1 are an image resource, a video resource, and a text resource, one group of multimedia sub-resources corresponding to the cartoon work A1 may be generated based on the image resource, the video resource, and the text resource. The multiple groups of multimedia sub-resources with the respective association relationships are multimedia sub-resources corresponding to the multiple works.

Further, because the user may have a requirement for continuously watching the multimedia sub-resources (for example, the user follows series of the cartoon work A1), to improve watching experience of the user, the multiple groups of multimedia sub-resources with respective association relationships may be determined based on a historical watching record of the user. In this embodiment, a specific implementation is as follows:

parsing the browsing request to obtain a user identifier, and extracting a historical watching record corresponding to the user identifier;

reading a target resource identifier based on the historical watching record, and determining a matching resource identifier that matches the target resource identifier; and extracting the multiple groups of multimedia sub-resources with respective association relationships from the multimedia resource library based on the target resource identifier and the matching resource identifier.

Specifically, the historical watching record specifically is a historical record of a multimedia sub-resource of a work watched by the user. The target resource identifier specifically is a resource identifier corresponding to a historical multimedia sub-resource watched by the user. The matching resource identifier specifically is a resource identifier corresponding to a multimedia sub-resource of another work that is similar to the work to which the historical multimedia sub-resource watched by the user belongs.

Based on this, after the browsing request is received, the user identifier is obtained by parsing the browsing request. In this case, the server can determine the historical watching record of the user of the client based on the user identifier. To facilitate the user to continue watching the multimedia sub-resource of the work recorded in the historical watching record, first, the target resource identifier is read based on the historical watching record, that is, a resource identifier corresponding to a multimedia sub-resource with a highest probability that the user continues to watch is determined. Then, the matching resource identifier that matches the target resource identifier is determined, that is, a resource identifier corresponding to a multimedia sub-resource in which the user may be interested is determined. Finally, the multiple groups of multimedia sub-resources with an association relationship are extracted from the multimedia resource library based on the target resource identifier and the matching resource identifier, that is, the multimedia resource can be subsequently fed back to the client for the browsing request.

In actual application, to quickly feed back latest update of the work to the user, a work with a largest probability that the user continues to watch can be determined based on the historical watching record, and an updated status of the work is queried. If a new multimedia sub-resource is updated for the work, the multimedia sub-resource may be directly extracted from the multimedia resource library and used to subsequently generate the multimedia resource. In addition, to facilitate the client to perform display to the user, the server may generate an information stream sorting list based on the target resource identifier and the matching resource identifier, that is, determine a sorting manner of the multiple groups of multimedia sub-resources with an association relationship, so that the client can quickly render a browsing page and display the browsing page to the user.

The foregoing example is still used. The user identifier of the user is determined based on the browsing request uploaded by the client, and the historical watching record is queried based on the user identifier, so that it is determined that the user watches the cartoon work A1, and a watching progress is the 49$^{th}$ file. In this case, if it is determined based on the historical watching record that a probability that the user may continue to watch the cartoon work A1 is the largest, the resource identifier ID_49 is determined as the target resource identifier, and the 50$^{th}$ file of image resource and the 197$^{th}$ to 200$^{th}$ episodes of video resources of the cartoon work A1 are extracted from the multimedia resource library to form one group of multimedia sub-resources with an association relationship. In addition, to be enable to recommend more works to the user, the matching resource identifier that matches the target resource identifier is determined, and matching resource identifiers correspond to the cartoon works A2, A3, . . . , and A10. The image resources and the video resources separately corresponding to the cartoon works A2, A3, . . . , and A10 are extracted from the multimedia resource library based on the matching resource identifier to form the multiple groups of multimedia sub-resources with an association relationship. Based on this, 10 groups of multimedia sub-resources with an association relationship are determined through statistics collection. To facilitate watching by the user, the information stream sorting list can be further generated based on the 10 groups of multimedia sub-resources with an association relationship corresponding to the cartoon works A1-A10, to facilitate the user to more intuitively understand the cartoon works A1-A10.

In addition, to facilitate the user to watch the multimedia sub-resource, when the information stream sorting list is generated, a multimedia sub-resource with the target resource identifier may be ranked first, and multimedia sub-resources corresponding to the matching resource identifier may be sorted in sequence based on degrees of matching with the multimedia sub-resource with the target resource identifier, thereby further improving user experience.

In conclusion, to provide the user with richer multimedia sub-resources, the target resource identifier and the matching resource identifier that matches the target resource identifier are determined based on the historical watching record of the user. Then, the multiple groups of multimedia sub-resources with an association relationship are extracted from the multimedia resource library based on the two types of identifiers, so that rich multimedia resources can be subsequently fed back to the client.

Step 606: Generate the multimedia resource based on the multiple groups of multimedia sub-resources with an association relationship, and send the multimedia resource to the client.

Specifically, based on the extracting the multiple groups of multimedia sub-resources with an association relationship from the multimedia resource library, in this case, the multimedia resource for the browsing request is further fed back to the client, that is, the multimedia resource is generated based on the multiple groups of multimedia sub-resources with an association relationship, and the multimedia resource is delivered to the client as a response to the browsing request, so that the client can display the browsing page to the user.

Further, if a request uploaded by the client is subsequently received again, it indicates that the user is interested in a multimedia sub-resource displayed on the browsing page. In this case, a new multimedia sub-resource may be delivered based on the received request. In this embodiment, a specific implementation is as follows:

receiving an associated resource request uploaded by the client;

extracting, from the multimedia resource library, an associated multimedia sub-resource that matches the associated resource request; and sending the associated multimedia sub-resource to the client.

Specifically, the associated resource request specifically is a resource request that is uploaded by the client and that is received by the server after receiving the browsing request, and the associated resource request specifically refers to requesting the server to deliver an associated multimedia sub-resource for a work. Based on this, when the associated resource request uploaded by the client is received, it indicates that the user of the client needs to watch at least two multimedia sub-resources by using the display page. In this case, the associated multimedia sub-resource that matches the associated resource request can be extracted from the multimedia resource library, and the associated multimedia sub-resource is sent to the client, so that the client can generate, based on the associated multimedia sub-resource and the multimedia resource, a display page including at least two multimedia sub-resources, and simultaneously play the at least two multimedia sub-resources to the user by using the display page.

According to the another multimedia resource display method provided in this embodiment, after the browsing request sent by the client is received, the multiple groups of multimedia sub-resources with an association relationship are extracted from the multimedia resource library based on the browsing request. The multimedia resource is generated based on the multiple groups of multimedia sub-resources with an association relationship, and is sent to the client as the response to the browsing request, to provide data support for the client to generate the display page including the at least two multimedia sub-resources, thereby implementing that a progress relationship of the at least two multimedia sub-resources is actively notified to the user, and further improving watching experience of the user.

Figure 7:
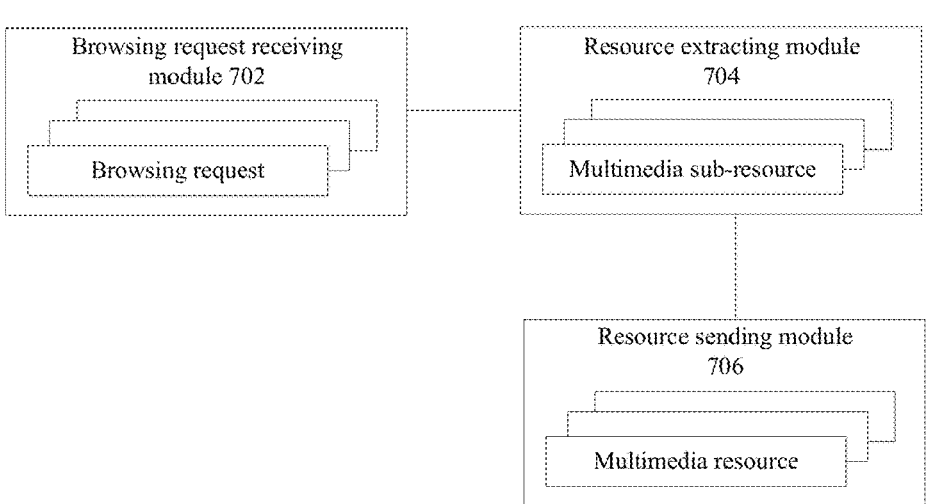
FIG. 7 is a schematic diagram of a structure of another multimedia resource display apparatus according to an embodiment of this application.

Corresponding to the foregoing method embodiments, this application further provides an embodiment of another multimedia resource display apparatus. FIG. 7 is a schematic diagram of a structure of another multimedia resource display apparatus according to an embodiment of this application. As shown in FIG. 7, the apparatus is applied to a server and includes:

a browsing request receiving module 702, configured to receive a browsing request sent by a client;

a resource extracting module 704, configured to extract, from a multimedia resource library, multiple groups of multimedia sub-resources with an association relationship that match the browsing request; and a resource sending module 706, configured to generate a multimedia resource based on the multiple groups of multimedia sub-resources with an association relationship, and send the multimedia resource to the client.

In an optional embodiment, the multimedia resource display apparatus further includes:

an association module, configured to associate the multimedia sub-resources, and configure a resource identifier for the multimedia sub-resources with an association relationship; and store the multimedia sub-resources with the resource identifier into the multimedia resource library.

In an optional embodiment, the association module is further configured to:

obtain field information of the multimedia sub-resources, and associate the multimedia sub-resources based on the field information; and/or obtain key frames of the multimedia sub-resources, and associate the multimedia sub-resources based on the key frames.

In an optional embodiment, the resource extracting module 704 is further configured to:

parse the browsing request to obtain a user identifier, and extract a historical watching record corresponding to the user identifier; read a target resource identifier based on the historical watching record, and determine a matching resource identifier that matches the target resource identifier; and extract the multiple groups of multimedia sub-resources with an association relationship from the multimedia resource library based on the target resource identifier and the matching resource identifier.

In an optional embodiment, the association module is further configured to:

associate the multimedia sub-resources based on a preset association granularity, where the association granularity correspondingly includes at least one of the following: a time association granularity, a playback association granularity, and an attribute association granularity.

In an optional embodiment, the multimedia resource display apparatus further includes:

a sending module, configured to receive an associated resource request uploaded by the client; extract, from the multimedia resource library, an associated multimedia sub-resource that matches the associated resource request; and send the associated multimedia sub-resource to the client.

In conclusion, after the browsing request sent by the client is received, the multiple groups of multimedia sub-resources with an association relationship are extracted from the multimedia resource library based on the browsing request. The multimedia resource is generated based on the multiple groups of multimedia sub-resources with an association relationship, and is sent to the client as a response to the browsing request, to provide data support for the client to generate a display page including at least two multimedia sub-resources, thereby implementing that a progress relationship of the at least two multimedia sub-resources is actively notified to the user, and further improving watching experience of the user.

The foregoing describes a schematic solution of the another multimedia resource display apparatus according to this embodiment. It should be noted that the technical solution of the multimedia resource display apparatus and the technical solution of the another multimedia resource display method belong to a same concept. For details not described in detail in the technical solution of the multimedia resource display apparatus, refer to the descriptions of the technical solution of the another multimedia resource display method.

Figure 8:
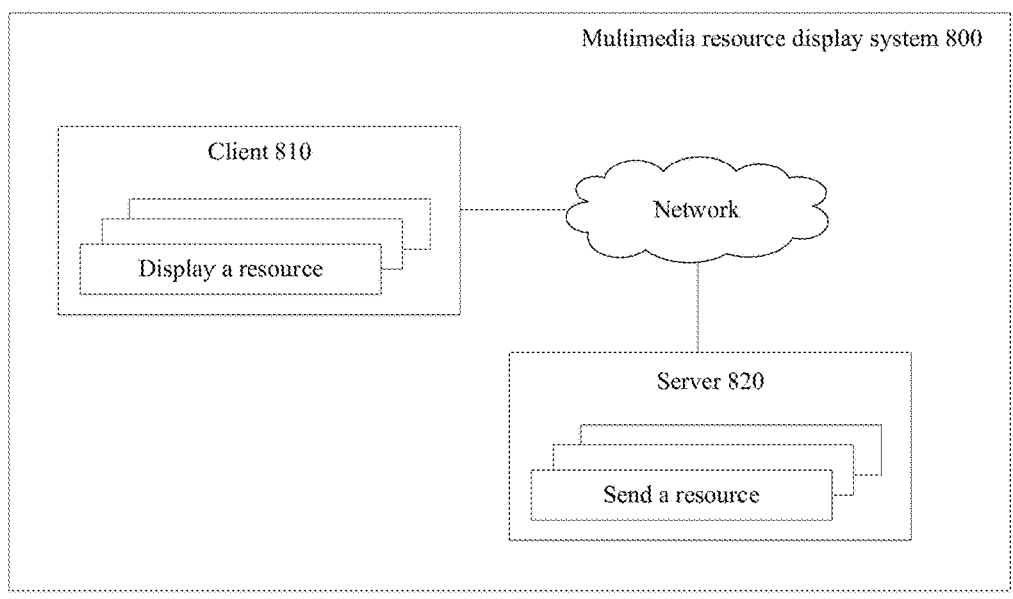
FIG. 8 is a schematic diagram of a structure of a multimedia resource display system according to an embodiment of this application.

This application further provides a multimedia resource display system. FIG. 8 is a schematic diagram of a structure of a multimedia resource display system according to an embodiment of this application. As shown in FIG. 8, the system 800 includes a client 810 and a server 820.

The client 810 is configured to obtain a browsing instruction submitted by a user, and send a browsing request to the server 820 based on the browsing instruction.

The server 820 is configured to: receive the browsing request; extract, from a multimedia resource library, multiple groups of multimedia sub-resources with an association relationship that match the browsing request; and generate a multimedia resource based on the multiple groups of multimedia sub-resources with an association relationship, and send the multimedia resource to the client 810.

The client 810 is further configured to: receive the multimedia resource delivered by the server 820 for the browsing request, and generate a browsing page based on the multimedia resource and display the browsing page to the user; when a touch instruction submitted by the user for the browsing page is received, determine multiple multimedia sub-resources with an association relationship from the multimedia resource based on the touch instruction; and generate, based on the multiple multimedia sub-resources, a display page including at least two multimedia sub-resources, and display the display page to the user.

It should be noted that, the client 810 is a terminal device held by the user, and the server 820 is an end that sends the multimedia resource to the client. Therefore, the client 810 and the server 820 need to be connected via a network, to implement resource intercommunication. Examples of the network may include a public switched telephone network (PSTN), a local area network (LAN), a wide area network (WAN), a private area network (PAN), or a combination of communication networks such as the Internet.

In conclusion, it is implemented that the at least two types of multimedia sub-resources with an association relationship can be simultaneously played on a same page, so that the user can accurately determine a progress relationship of the at least two types of multimedia sub-resources with an association relationship. This not only saves time of the user for confirming the progress relationship, but also can simultaneously display the at least two types of multimedia sub-resources to the user, and further improves watching experience of the user, so that the user can select, based on a requirement, a multimedia sub-resource suitable for a watching habit of the user to watch, thereby increasing a user reach rate.

The foregoing describes a schematic solution of the multimedia resource display system according to this embodiment. It should be noted that the technical solution of the multimedia resource display system corresponds to the technical solutions of the foregoing two multimedia resource display methods. For details not described in detail in the technical solution of the multimedia resource display system, refer to the descriptions of the technical solutions of the foregoing two multimedia resource display methods.

Figure 9:
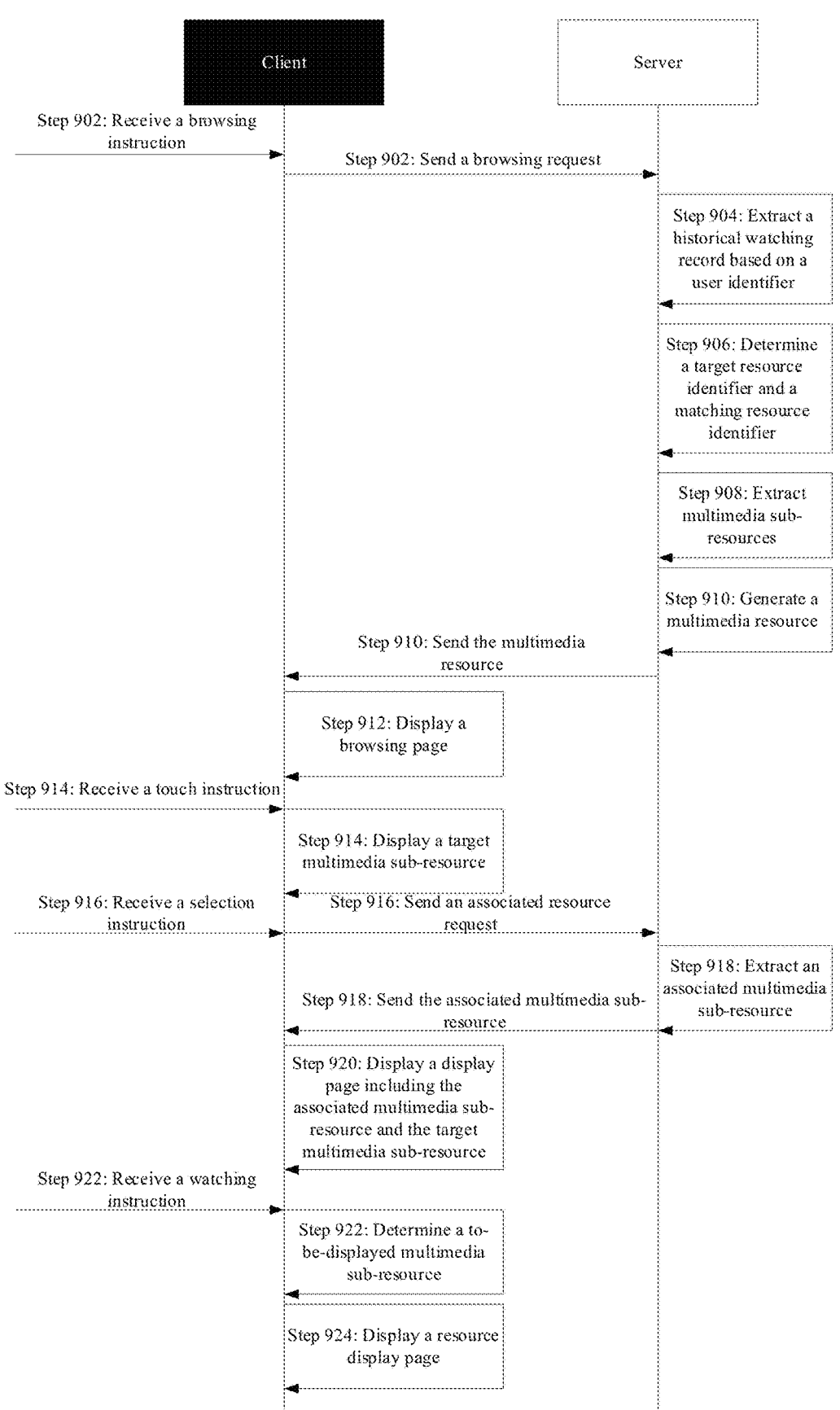
FIG. 9 is a schematic diagram of a multimedia resource display method applied to a cartoon and animation playback scenario according to an embodiment of this application.

With reference to FIG. 9, the following further describes the multimedia resource display method by using an application of the multimedia resource display method provided in this application in a cartoon and animation playback scenario as an example. FIG. 9 is a schematic diagram of a multimedia resource display method applied to a cartoon and animation playback scenario according to an embodiment of this application. The method specifically includes the following steps:

Step 902: A client receives a browsing instruction of a user, and sends, to a server based on the browsing instruction, a browsing request including a user identifier.

Step 904: The server receives the browsing request including the user identifier, and extracts a historical watching record corresponding to the user identifier.

Step 906: The server reads a target resource identifier based on the historical watching record, and determines a matching resource identifier that matches the target resource identifier.

Step 908: The server extracts multiple groups of multimedia sub-resources with an association relationship from a multimedia resource library based on the target resource identifier and the matching resource identifier.

Specifically, after the historical watching record of the user is determined, in this case, it is determined that a cartoon work with a highest user interest is A1. In addition, to be able to recommend another cartoon work that is similar to the cartoon work A1 to the user, a matching resource identifier corresponding to the another cartoon work is determined based on a target resource identifier corresponding to the cartoon work A1. Then, multimedia sub-resources corresponding to the cartoon work A1, such as a work cover, a title resource, and an image resource, are extracted from the multimedia resource library based on the target resource identifier. In addition, multimedia sub-resources corresponding to the another cartoon work are used as multimedia sub-resources with an association relationship that correspond to each cartoon work.

In addition, an information stream sorting list can be generated based on the multiple groups of multimedia sub-resources with an association relationship, so that the server can send, to the client based on the list, a material resource corresponding to each cartoon work.

Step 910: The server generates a multimedia resource based on the multiple groups of multimedia sub-resources with an association relationship, and sends the multimedia resource to the client.

Step 912: The client receives the multimedia resource, and generates a browsing page based on the multimedia resource and displays the browsing page to the user.

Specifically, after the multimedia resource is obtained, in this case, the browsing page is generated based on the multimedia resource, so that the user can watch the cartoon work A1 and the another cartoon work similar to the cartoon work A1 by using the browsing page. It should be noted that, content displayed on the browsing page is introduction information corresponding to each cartoon work, such as a name, an author, a cover image, and a type label of the cartoon work.

Step 914: When receiving a touch instruction submitted by the user by using the browsing page, the client displays a target multimedia sub-resource to the user by using the browsing page.

Specifically, when the user submits a touch instruction for the cartoon work A1 in the browsing page, it indicates that the user is interested in the cartoon work A1. In this case, a promotional video resource of the cartoon work A1 is displayed on the browsing page.

Step 916: When receiving a selection instruction submitted by the user by using the browsing page, the client sends an associated resource request to the server based on the selection instruction.

Specifically, when the selection instruction submitted by the user by using the browsing page is received, it indicates that the user needs to watch the cartoon work A1. In this case, to facilitate watching the cartoon work A1 and to watch the cartoon work A1 in multiple different watching manners, based on the selection instruction submitted by the user, the server is requested to deliver an animation video resource corresponding to the cartoon work A1.

Step 918: The server receives the associated resource request, and extracts an associated multimedia sub-resource from the multimedia resource library based on the associated resource request, and sends the associated multimedia sub-resource to the client.

Specifically, after receiving the associated resource request, the server determines that the user needs to watch the cartoon work A1. In this case, the server extracts, from the multimedia resource library based on the associated resource request, the animation video resource corresponding to the cartoon work A1, and sends the animation video resource to the client.

Step 920: The client receives the associated multimedia sub-resource delivered by the server, and generates a display page based on the associated multimedia sub-resource and the target multimedia sub-resource and displays the display page to the user.

Specifically, because the user has watched the cartoon work A1, when the cartoon work A1 is watched again, a cartoon chapter finished by the user last time is used as a starting node for current displaying the cartoon work A1, and an image resource of the cartoon work A1 after the cartoon chapter finished last time is displayed to the user. That is, the display page is generated based on a fifth file of image resource of the cartoon work A1 and a tenth episode of animation video resource corresponding to the fifth file of image resource. The fifth file of the cartoon work A1 and the tenth episode of animation video resource corresponding to the fifth file are displayed by using the display page, so that the user can simultaneously watch, on the display page, the image resource and the video resource with matched a progress relationship.

Step 922: When receiving a watching instruction submitted by the user for the display page, the client determines a to-be-displayed multimedia sub-resource based on the watching instruction.

Step 924: The client generates a resource display page based on the to-be-displayed multimedia sub-resource, and performs displays to the user.

Specifically, when a watching instruction submitted by the user for the image resource in the display page is received, it indicates that the user needs to watch the image resource of the cartoon work A1. In this case, the resource display page is generated based on the image resource of the cartoon work A1 (namely, the fifth file of image resource corresponding to the cartoon work A1) and is displayed to the user. In addition, to avoid interference from the video resource to the user, a video player in the display page that plays the animation video resource is disabled.

In conclusion, at least two types of multimedia sub-resources with an association relationship can be simultaneously played on a same page, so that the user can accurately determine a progress relationship of the at least two types of multimedia sub-resources with an association relationship. This not only saves time of the user for confirming the progress relationship, but also can simultaneously display the at least two types of multimedia sub-resources to the user, and further improves watching experience of the user, so that the user can select, based on a requirement, a multimedia sub-resource suitable for a watching habit of the user to watch, thereby improving a user reach rate.

Figure 10:
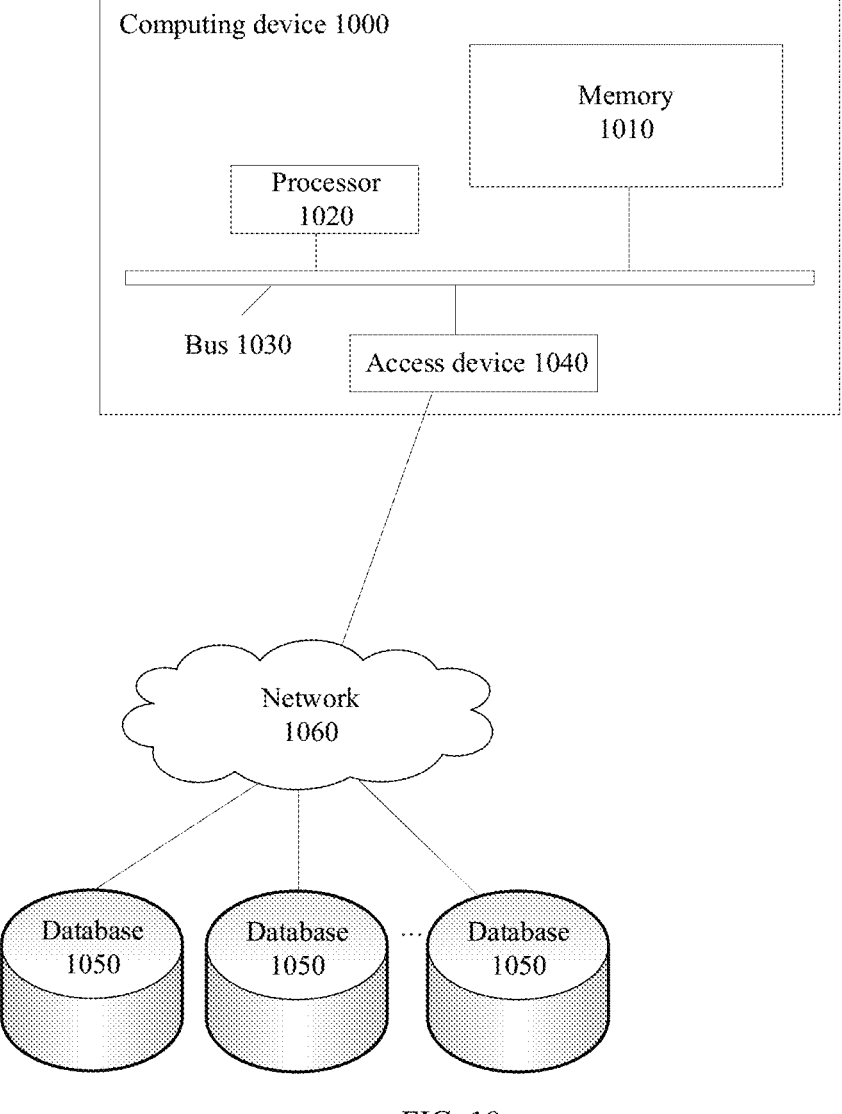
FIG. 10 is a block diagram of a structure of a computing device according to an embodiment of this application.

FIG. 10 is a block diagram of a structure of a computing device 1000 according to an embodiment of this application. Components of the computing device 1000 include but are not limited to a memory 1010 and a processor 1020. The processor 1020 and the memory 1010 are connected by using a bus 1030, and a database 1050 is configured to store data.

The computing device 1000 further includes an access device 1040, and the access device 1040 enables the computing device 1000 to communicate via one or more networks 1060. Examples of these networks include a public switched telephone network (PSTN), a local area network (LAN), a wide area network (WAN), a private area network (PAN), or a combination of communication networks such as the Internet. The access device 1040 may include one or more of any type of wired or wireless network interface (for example, a network interface card (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In an embodiment of this application, the foregoing components of the computing device 1000 and other components not shown in FIG. 10 may alternatively be connected to each other, for example, by using the bus. It should be understood that the block diagram of the structure of the computing device shown in FIG. 10 is merely used as an example instead of a limitation on the scope of this application. A person skilled in the art may add or replace other components as required.

The computing device 1000 may be any type of static or mobile computing device, including: a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses); another type of mobile device; or a static computing device, for example, a desktop computer or a PC. The computing device 1000 may alternatively be a mobile or still server.

When the processor 1020 executes instructions, the steps of the multimedia resource display method are implemented.

The foregoing describes a schematic solution of the computing device in this embodiment. It should be noted that the technical solution of the computing device and the technical solutions of the foregoing two multimedia resource display methods belong to a same concept. For details not described in detail in the technical solution of the computing device, refer to the descriptions of the technical solutions of the foregoing two multimedia resource display methods.

An embodiment of this application further provides a computer-readable storage medium, where the computer-readable storage medium stores computer instructions, and when the instructions are executed by a processor, the steps of the foregoing two multimedia resource display methods are implemented.

The foregoing describes a schematic solution of the computer-readable storage medium according to this embodiment. It should be noted that the technical solution of the storage medium and the technical solutions of the foregoing two multimedia resource display methods belong to a same concept. For details not described in detail in the technical solution of the storage medium, refer to the descriptions of the technical solutions of the foregoing two multimedia resource display methods.

An embodiment of this application further provides a computer program product. When the computer program product is executed in a computer, the computer is enabled to perform the steps of the foregoing two multimedia resource display methods.

The foregoing describes a schematic solution of the computer program product in this embodiment. It should be noted that the technical solution of the computer program product and the technical solutions of the foregoing two multimedia resource display methods belong to a same concept. For details not described in detail in the technical solution of the computer program product, refer to the descriptions of the technical solutions of the foregoing two multimedia resource display methods.

Specific embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program product code. The computer program product code may be in a source code form, an object code form, an executable file form, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program product code. It should be noted that, content included in the computer-readable medium may be appropriately added or deleted according to the demands of legislation and patent practice in a jurisdiction, for example, in some jurisdictions, according to legislation and patent practice, the computer-readable medium includes neither the electrical carrier signal nor the telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in this specification are all preferred embodiments, and involved actions and modules are not necessarily mandatory to this application.

In the foregoing embodiments, descriptions of the embodiments have respective focuses. For a part that is not described in detail in an embodiment, refer to related descriptions in another embodiment.

The preferred embodiments of this application disclosed above are merely intended to help describe this application. The optional embodiments do not describe all details, and the present invention is not limited to the specific implementations. Clearly, many modifications and changes may be made based on the content of this application. These embodiments are selected and specifically described in this application to better explain the principle and the actual application of this application, so that a person skilled in the art can better understand and use this application.

This application is only subjected to the claims and the scope and equivalents thereof.

What is claimed is:

1. A method of display multimedia resources, applied to a client computing device, comprising:

obtaining a browsing instruction submitted by a user, and sending a browsing request to a server based on the browsing instruction;

receiving a multimedia resource delivered by the server based on the browsing request;

generating a browsing page based on the multimedia resource and displaying the browsing page to the user, wherein the generating a browsing page based on the multimedia resource further comprises:

creating multiple groups of sub-resources based on the multimedia resource, determining browsing information corresponding to each of the multiple groups of sub-resources, generating a browsing unit based on the browsing information and a corresponding group of sub-resources, and generating the browsing page by adding browsing units corresponding to each of the multiple groups of sub-resources to a target page template;

in response to receiving a touch instruction performed by the user on the browsing page, determining multiple sub-resources with an association relationship from the multimedia resource based on the touch instruction, wherein the multiple sub-resources belong to a same group of sub-resources; and generating a display page comprising at least two sub-resources among the multiple sub-resources, and displaying the display page to the user.

2. The method according to claim 1, wherein the sending a browsing request to a server based on the browsing instruction comprises:

determining a user identifier of the user based on the browsing instruction; and generating the browsing request based on the user identifier and sending the browsing request to the server.

3. The method according to claim 1, wherein the generating a browsing page based on the multimedia resource further comprises:

determining the target page template from a preset library of page templates.

4. The method according to claim 1, wherein the touch instruction is a tap instruction or a stay instruction, the tap instruction is generated when the user taps the browsing page, and the stay instruction is generated when a duration in which the browsing page is not tapped exceeds a preset duration threshold.

5. The method according to claim 1, wherein the determining multiple sub-resources with an association relationship from the multimedia resource comprises:

determining a target sub-resource from the multimedia resource based on the touch instruction, and displaying the target sub-resource to the user via the browsing page;

in response to receiving a selection instruction performed by the user on the browsing page, determining, from the multimedia resource, an associated sub-resource that has the association relationship with the target sub-resource; and determining the multiple sub-resources with the association relationship based on the target sub-resource and the associated sub-resource.

6. The method according to claim 1, wherein the determining multiple sub-resources with an association relationship from the multimedia resource based on the touch instruction comprises:

determining a target sub-resource from the multimedia resource based on the touch instruction, and displaying the target sub-resource to the user via the browsing page;

in response to receiving a selection instruction performed by the user on the browsing page, sending an associated resource request to the server based on the selection instruction; and receiving an associated sub-resource delivered by the server based on the associated resource request, and determining the multiple sub-resources based on the target sub-resource and the associated sub-resource.

7. The method according to claim 1, wherein the generating a display page comprising at least two sub-resources based on the multiple sub-resources comprises:

obtaining an initial display page, and determining a page layout rule of the initial display page;

selecting, from the multiple sub-resources, the at least two sub-resources that match the page layout rule; and generating the display page based on adding the at least two sub-resources to the initial display page.

8. The method according to claim 1, wherein after the displaying the display page to the user, the method further comprises:

in response to receiving a watching instruction performed by the user on the display page, determining a to-be-displayed sub-resource from the at least two sub-resources based on the watching instruction; and generating a resource display page based on the to-be-displayed sub-resource, and displaying the resource display page to the user.

9. The method according to claim 8, wherein the to-be-displayed sub-resource is a video resource or an image resource; and wherein the generating a resource display page based on the to-be-displayed sub-resource comprises:

generating a video playback page based on the video resource, or generating an image display page based on the image resource.

10. The method according to claim 1, wherein after the displaying the display page to the user, the method further comprises:

in response to determining that a playback progress of any one of the at least two sub-resources reaches a preset jump node, updating the display page based on the at least two sub-resources, and displaying an updated display page to the user.

11. A client computing device, comprising a memory, a processor, and computer instructions stored in the memory and executable by the processor, wherein when the processor executes the instructions, the processor implements operations comprising:

obtaining a browsing instruction submitted by a user, and sending a browsing request to a server based on the browsing instruction;

receiving a multimedia resource delivered by the server based on the browsing request;

generating a browsing page based on the multimedia resource and displaying the browsing page to the user, wherein the generating a browsing page based on the multimedia resource further comprises:

creating multiple groups of sub-resources based on the multimedia resource, determining browsing information corresponding to each of the multiple groups of sub-resources, generating a browsing unit based on the browsing information and a corresponding group of sub-resources, and generating the browsing page by adding browsing units corresponding to each of the multiple groups of sub-resources to a target page template;

in response to receiving a touch instruction performed by the user on the browsing page, determining multiple sub-resources with an association relationship from the multimedia resource based on the touch instruction, wherein the multiple sub-resources belong to a same group of sub-resources; and generating a display page comprising at least two sub-resources among the multiple sub-resources, and displaying the display page to the user.

12. The client computing device according to claim 11, the operations further comprising:

determining a user identifier of the user based on the browsing instruction; and generating the browsing request based on the user identifier and sending the browsing request to the server.

\* \* \* \* \*